United States Patent
Chavez, Jr. et al.

(10) Patent No.: US 6,256,299 B1
(45) Date of Patent: Jul. 3, 2001

(54) AUTOMATIC SERVICE PROVIDER NOTIFICATION OF UNAUTHORIZED TERMINAL ACTIVITY

(75) Inventors: David L. Chavez, Jr., Thornton; Larry J. Hardouin, Westminster, both of CO (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/071,050

(22) Filed: Apr. 30, 1998

(51) Int. Cl.$^7$ .................................................. H04Q 7/00
(52) U.S. Cl. .................................. 370/329; 455/411
(58) Field of Search .......................... 455/405, 406–411; 379/112–115, 145, 188, 191–2, 196, 197; 370/310, 329, 340, 270

(56) References Cited

U.S. PATENT DOCUMENTS

| | | | |
|---|---|---|---|
| 5,826,185 | * 10/1998 | Wise et al. ........................... | 455/405 |
| 5,828,737 | * 10/1998 | Sawyer ................................ | 379/114 |
| 5,850,599 | * 12/1998 | Seiderman ........................... | 455/406 |
| 5,854,975 | * 12/1998 | Fougnies et al. .................... | 455/408 |

\* cited by examiner

Primary Examiner—David R. Vincent
(74) Attorney, Agent, or Firm—John C. Moran

(57) ABSTRACT

Automatically connecting an unauthorized wireless terminal to a service provider agent so that online registration can be performed to provide permanent service to the wireless terminal. The wireless terminal is initially connected to a service provider agent by a telephone call from the wireless terminal via a call center having a plurality of agents when the wireless terminal first attempts to register with the service provider's wireless switching network. From the point of view of the user, the user may purchase a wireless terminal off the shelf of a mass merchandiser or in the corporate setting simply check a wireless terminal out of a stock room. When the user initially turns the power of the wireless terminal on, a call is placed to an agent of the service provider so that the registration may take place. All necessary information that must be loaded into the wireless telephone will be downloaded during this registration process. To prevent fraudulent use of the wireless terminal, the user sets up their service profile to prohibit certain types of activity. The user will have a personal identification number (PIN) that may be utilized to perform these activities on a selective basis. The PIN could be the mother's maiden name or secured credit. In addition, authorization could be performed where the PIN would actually be voice recognition. Once a user performs an activity that is not allowed in their service profile, they would be transferred to an agent of the service provider. By identifying themselves with the PIN, the user would be allowed to perform the restricted activity on a one-time basis, for a short period of time, or permanently change their service profile so that the activity could be performed all the time.

18 Claims, 6 Drawing Sheets

AUTOMATIC SERVICE PROVIDER NOTIFICATION OF UNAUTHORIZED TERMINAL ACTIVITY

TECHNICAL FIELD

This invention relates to wireless switching systems, and in particular, to administration of wireless switching systems with respect to wireless terminals.

BACKGROUND OF THE INVENTION

Wireless service also referred to as cellular service has been extremely popular in both public telephone networks and in private telephone networks such as business telecommunication switching systems. Whereas wireless services have provided a useful service for users, there are problems associated with the provision of wireless service both from the point of view of a user and a supplier of wireless services. The first of these problems is that when a wireless terminal is first activated, it is necessary for a skilled salesperson or technical support personnel to perform the activation of the wireless terminal for entering the service profile of the user and identifying the wireless terminal to the wireless switching system. The problem this creates is that it is not possible to mass-market wireless terminals in a manner similar to smaller electronic devices such as cassette tape players are marketed. It is simply not possible for a consumer to walk into a store, pick a wireless terminal from a shelf, pay for it, walk outside, and perform the necessary actions to utilize that wireless terminal. Within a corporation, users of wireless terminals connected to a business telecommunication switching system still need the help of a skilled individual to activate a wireless terminal. This normally requires the utilization of technical support people whose job is to go from new users' offices enabling their wireless terminals. In addition, fraudulent activity associated with wireless terminals cost both the users and the service providers millions of dollars a year. One fraudulent activity is the stealing of a wireless terminal and then using that wireless terminal to make long distance telephone calls either domestic or foreign. At present, fraud detection software is commonly used to detect fraudulent call activity based on the normal patterns of the user. This software has been found to be ineffective.

SUMMARY OF THE INVENTION

The foregoing problems are solved and a technical advance is achieved by an apparatus and method that automatically connect an unauthorized wireless terminal to a service provider agent so that online registration can be performed to provide permanent service to the wireless terminal. Advantageously, the wireless terminal is initially connected to a service provider agent by a telephone call from the wireless terminal via a call center having a plurality of agents when the wireless terminal first attempts to register with the service provider's wireless switching network. From the point of view of the user, the user may purchase a wireless terminal off the shelf of a mass merchandiser or in the corporate setting simply check a wireless terminal out of a stock room. When the user initially turns the power of the wireless terminal on, a call is placed to an agent of the service provider so that the registration may take place. Advantageously, all necessary information that must be loaded into the wireless telephone will be downloaded during this registration process. To prevent fraudulent use of the wireless terminal, the user sets up their service profile to prohibit certain types of activity. Advantageously, the user will have a personal identification number (PIN) that may be utilized to perform these activities on a selective basis. The PIN could be the mother's maiden name or secured credit. In addition, authorization could be performed where the PIN would actually be voice recognition. Once a user performs an activity that is not allowed in their service profile, they would be transferred to an agent of the service provider. By identifying themselves with the PIN, the user would be allowed to perform the restricted activity on a one-time basis, for a short period of time, or permanently change their service profile so that the activity could be performed all the time. An example of such an activity is the ability to make long distance telephone calls either domestic or foreign. If the user during the registration process determines that they do not want to make long distance telephone calls, but later changes their mind, they still can make the long distance telephone call but will initially be connected to a wireless service provider system and required to enter the PIN before the long distance call can be completed. This prevents a thief from making long distance telephone calls using a stolen wireless terminal. In addition, the user may modify their service profile by contacting the service provider's call center and using the PIN to have the call center change the service profile.

These and other features and advantages of the invention will become more apparent from the following description of an illustrated embodiment of the invention considered together with the following drawing.

DETAILED DESCRIPTION

Figure 1:
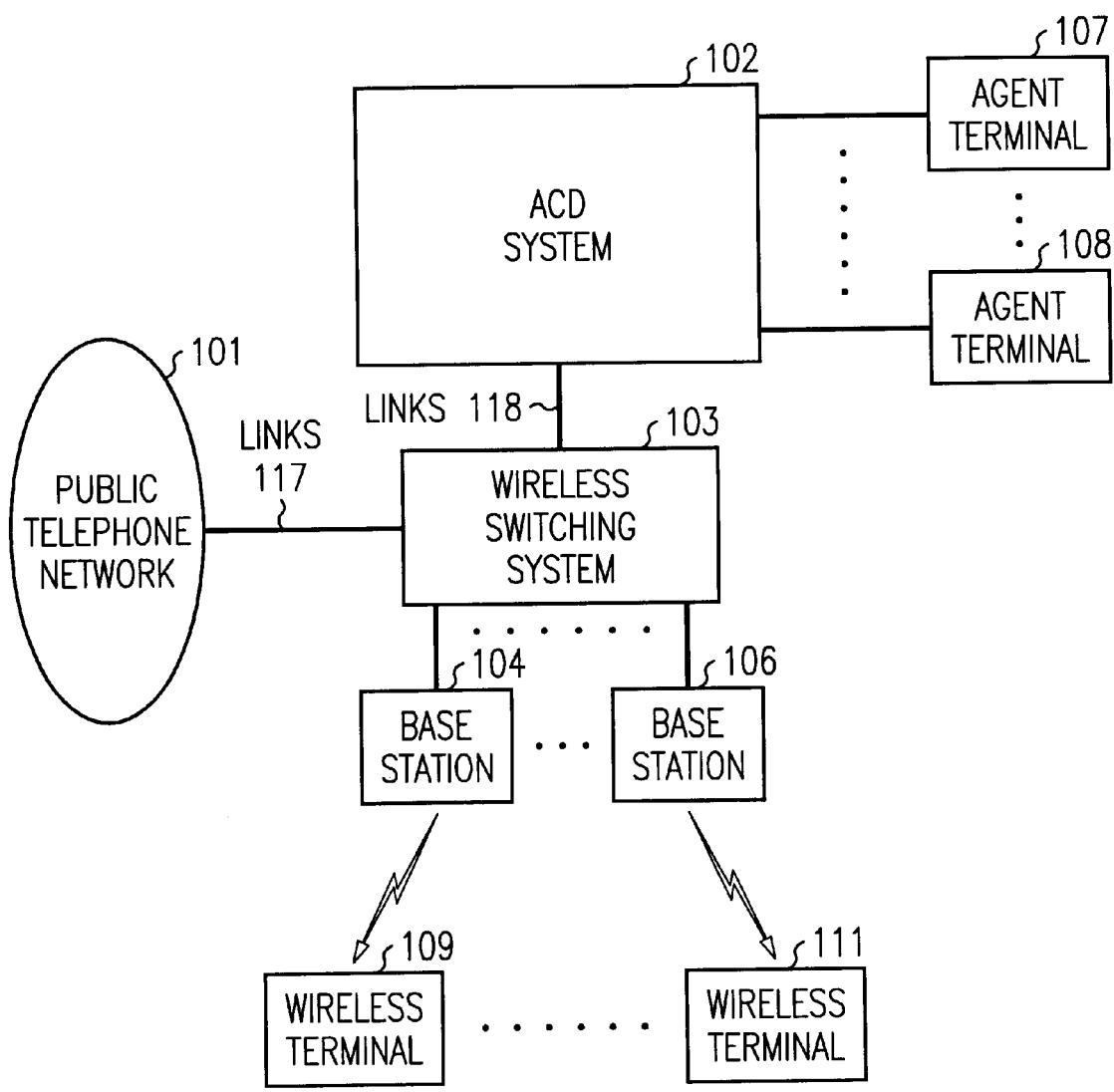
FIG. 1 is a block diagram of a system for implementing the invention.

As illustrated in FIG. 1, wireless switching system 103 is providing wireless service via base stations 104–106 to wireless terminals 109–111. Wireless switching system 103 can interconnect the wireless terminals for calls between the wireless terminals or to public telephone network 101 via links 117 for calls from other types of terminals. Automatic call distribution (ACD) system 102 provides administrative support for wireless switching system 103. Wireless switching system 103 is interconnected to ACD system 102 via links 118. Agents utilizing agent terminals 107–108 interact with the users of wireless terminals 109–111.

To understand the operation of the system in accordance with the invention, consider the following example. Assume that wireless terminal 109 has never registered and had no authorized service on wireless switching system 103. When wireless terminal 109 first attempts registration via base station 104 with wireless switching system 103, wireless switching system 103 establishes a call via ACD system 102 with the agent utilizing agent terminal 108. The agent then obtains the necessary information such as billing information from the user of wireless terminal 109 and the type of service profile that the user desires. The agent then enters this into the database of ACD system 102 which transfers the service profile to wireless switching system 103. In addition, the portions of the service profile needed in wireless terminal 109 are downloaded via base station 104 by wireless switching system 103 to wireless terminal 109. ACD system 102 also transfers to wireless terminal 109 during initialization of the terminal a password that must be present for further modifications to be made to the service profile information that is stored in wireless terminal 109. Part of the information retained by ACD system 102 is the personal identification number (PIN) chosen by the user of wireless terminal 109.

Further, assume that the user of wireless terminal 109 has chosen to restrict the ability to make long distance telephone calls via public telephone network 101. If a long distance telephone call is attempted from wireless terminal 109, wireless switching system 103 transfers the call to ACD system 102. ACD system 102 transfers the call to one of the agents on agent terminals 107–108. The agent then requests the PIN from the user of wireless terminal 109. If the correct PIN is received, the agent sends a command to wireless switching system 103 via ACD system 102 to allow the establishment of the long distance call. If the correct PIN number is not received, the agent causes proper procedures to be instituted to mark wireless terminal 109 as potentially having been stolen. One skilled in the art could clearly envision that ACD system 102 could be replaced by one or more agents using telephones directly attached to wireless switching system 103 where the telephones were either wireless or wired telephones.

Figure 3:
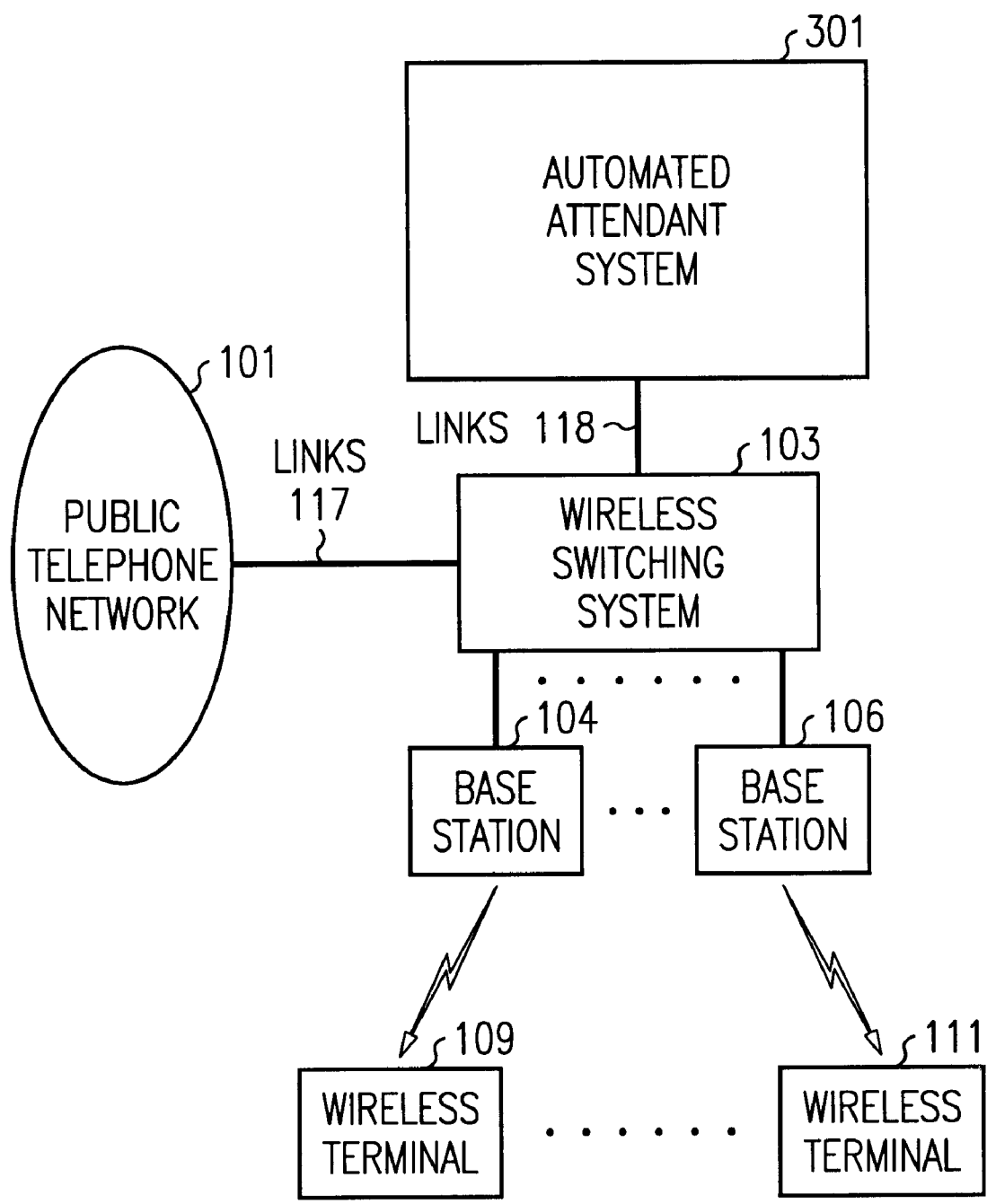
FIG. 3 is a block diagram of a system illustrating a second embodiment for implementing the invention.

FIG. 3 illustrates a second embodiment of the invention where ACD system 102 has been replaced by automated attendant system 301. Automated attendant system 301 will perform all of the previously described operations of ACD system 102 using techniques well known in the art.

Figure 2:
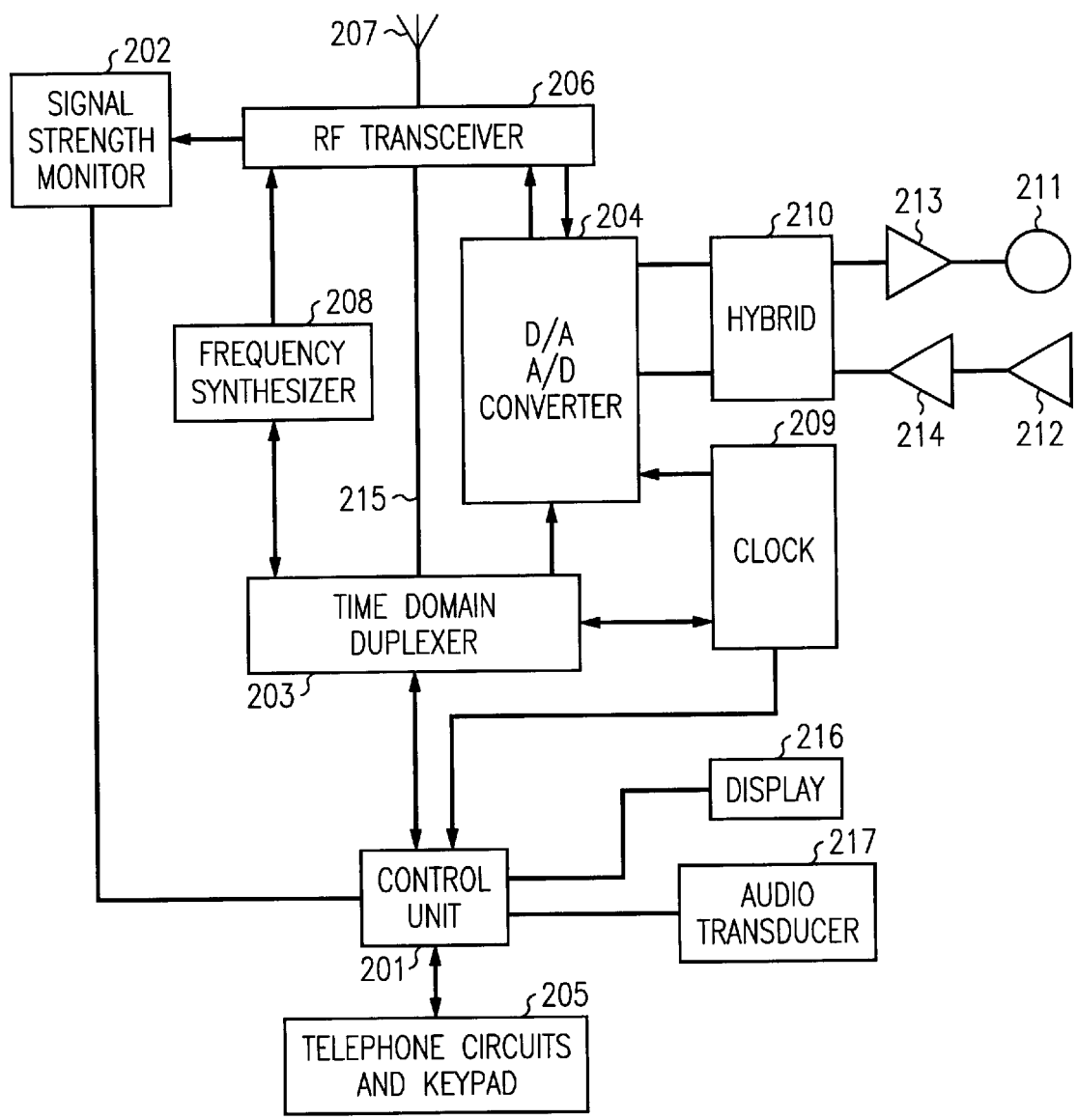
FIG. 2 is a block diagram of a wireless terminal for implementing the invention.

Wireless terminal 109 is advantageously illustrated in greater detail in FIG. 2. The other wireless terminals are similar in design. Wireless terminal 109 implements a wireless protocol that allows wireless terminal 109 to maintain a wireless signal link with wireless switching system 103 via base stations included in wireless switching system 103. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless terminal is provided by control unit 201. Units 202, 203, 206, 207, 208, and 209 provide the RF communication capabilities for the wireless terminal. Elements 204, 210, and 211–214 provide the audio information received and transmitted to the user; whereas, elements 216–217 and 205 provide the basic user interface. Control unit 201 is responsive to service profile and password information received via the PHS protocol messages to store this information internally.

Figure 4:
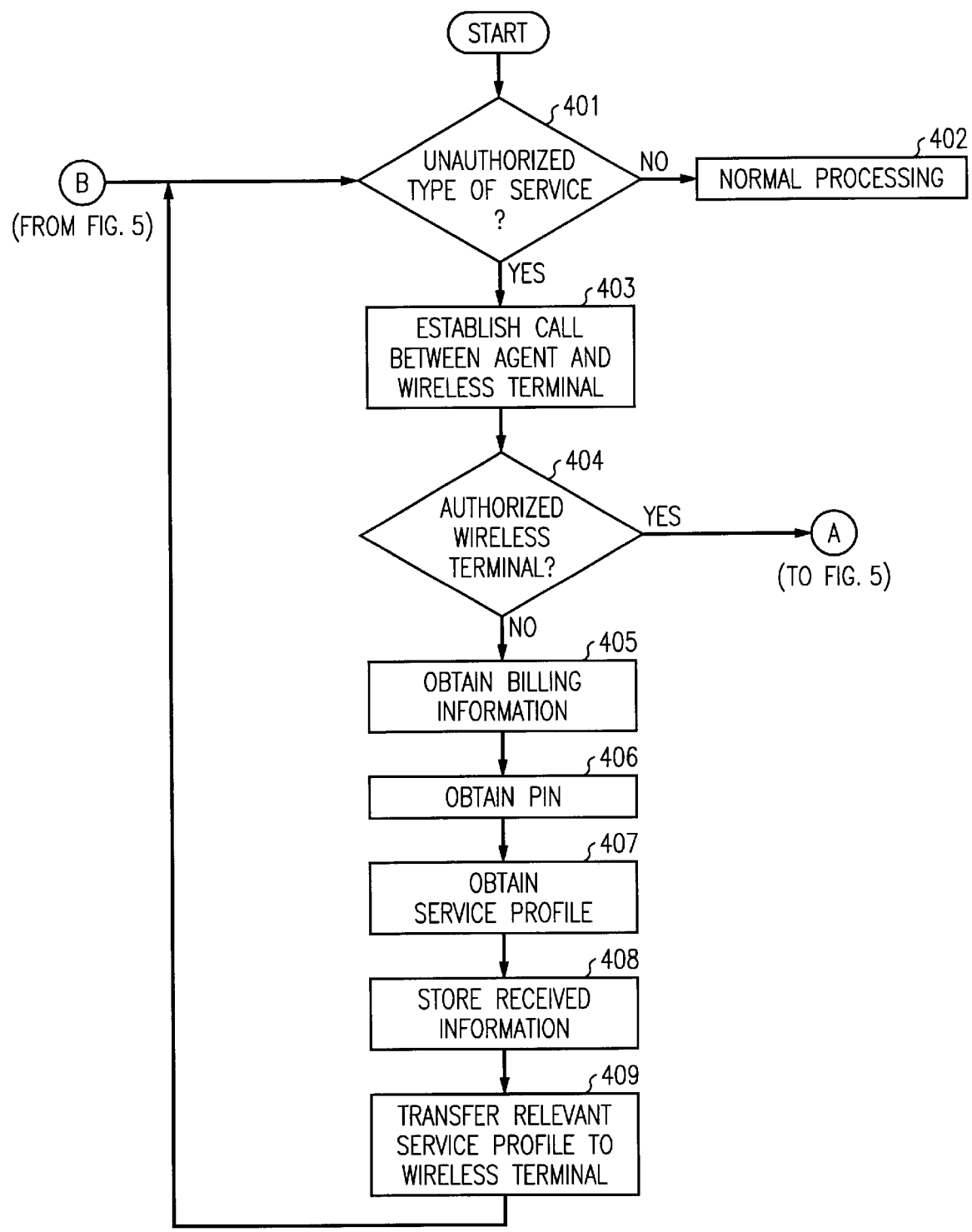
FIGS. 4 and 5 are a flow diagram of the operations performed by a wireless service provider call center or wireless switching system.
Figure 5:
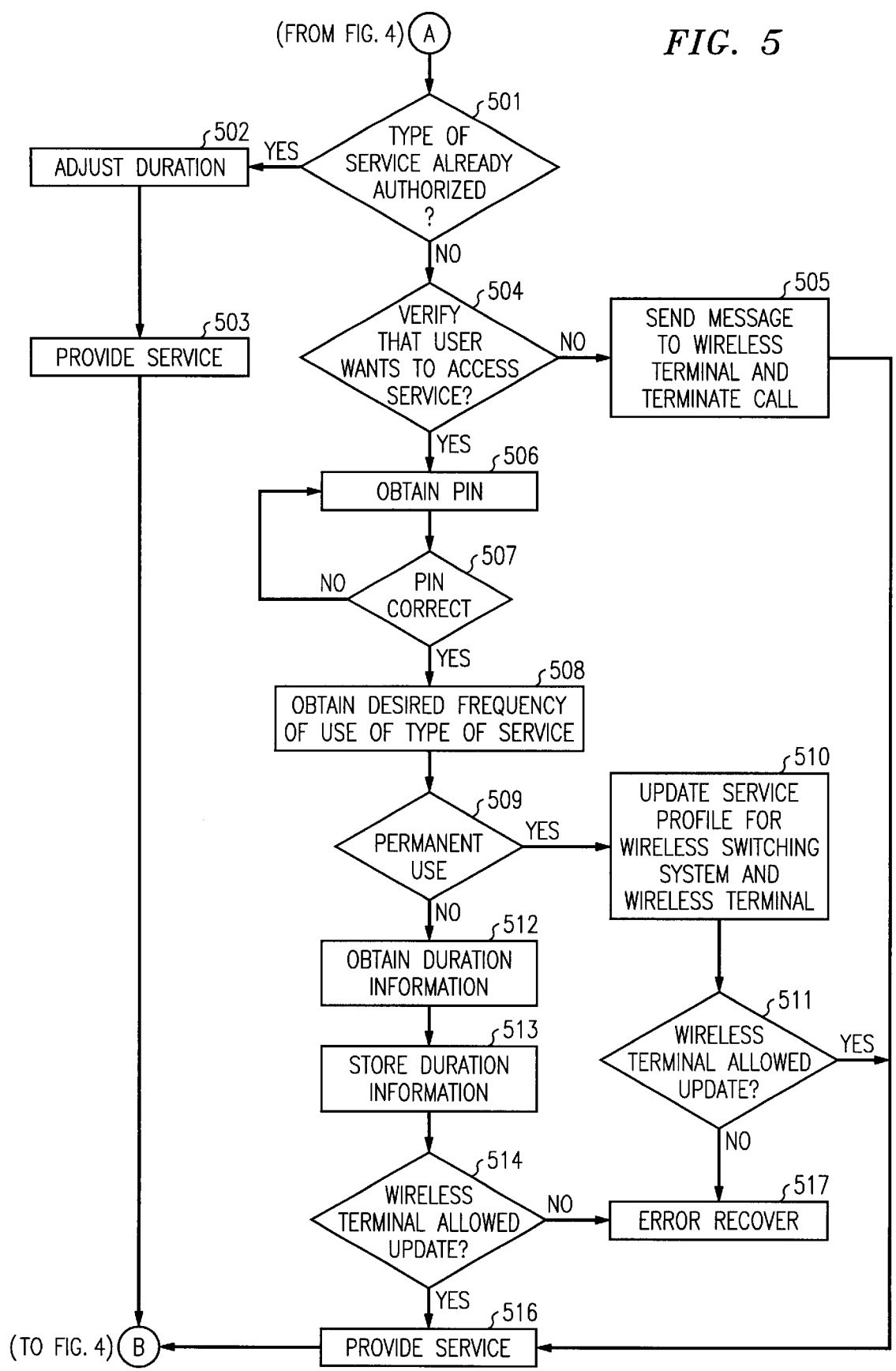

FIGS. 4 and 5 illustrate, in flow chart form, the operations performed by wireless switching system 103 and ACD system 102 utilizing an agent in FIG. 1. The second embodiment of the invention as illustrated in FIG. 3 would implement the same operations illustrated in FIGS. 4 and 5 with the exception that the operations described as being performed by ACD system 102 and an agent would be performed by automatic attendant system 301. In decision block 401, wireless switching system 103 determines if an unauthorized type of service has been attempted by a wireless terminal. If the answer is no, control is transferred to block 402 for normal processing. After completion of block 402, control is transferred back to decision block 401. If the answer in decision block 401 is yes, wireless switching system 103 establishes a call between ACD system 102 and the wireless terminal by execution of block 403. ACD system 102 then selects an agent to handle this call. ACD system 102 determines if the wireless system is authorized to use any type of wireless service, e.g., authorized to utilize wireless switching system 103 by execution of decision block 404. One skilled in the art could readily see that this operation could be performed by wireless switching system 103. If the answer in decision block 404 is yes, this indicates that the user of the wireless terminal is attempting a type of wireless service that is not allowed by the wireless terminal's service profile. Decision block 404 transfers control to decision block 501 of FIG. 5. If the answer is no in decision block 404, the information necessary to bill the user for the use of wireless services is obtained by execution of block 405. In normal operations, this would be obtaining a credit card number for public wireless service or an employee or department number for private wireless service. The personal identification number information is obtained by execution of block 406. In place of a PIN number, voice recognition could also be utilized and at this time block 406 would obtain a voice print of the user. Execution of block 407 then obtains from the user the information necessary to establish the service profile. In the case of private wireless service, the company providing this service may wish to restrict the access that different employees are allowed and these requirements impact the service profile. The service profile and PIN are then stored in ACD system 102 and/or wireless switching system 103 by execution of block 408. Block 409 then transfers the relevant service profile information to the wireless terminal. Block 409 also transfers to the wireless terminal a unique password which must be utilized if any other changes to the service profile are to be allowed by the wireless terminal. After execution of block 409, control is transferred back to decision block 401.

Returning to decision block 404, if the wireless terminal had already been authorized for wireless service, control is transferred to decision block 501 of FIG. 5. Decision block 501 determines if the type of service is already being allowed on a temporary authorization. If the answer is yes, control is transferred to block 502 which adjusts the duration of the temporary period if necessary. Block 503 then provides the service before transferring control back to decision block 401 of FIG. 4. If the answer in decision block 501 is no, decision block 504 ascertains if the user wants to access the type of service or a mistake has been made by the user. If the answer is no that the user does not want to access this type of service, control is transferred to block 505 which transmits a message to the user of the wireless terminal informing them that the call is being terminated and then terminates the call before returning control back to decision block 401 of FIG. 4.

If the answer in decision block 504 is yes, control is transferred to decision block 506 to obtain the PIN information from the user. Decision block 507 determines if the PIN information is correct. If the PIN information is not correct, decision block 507 transfers control back to block 506. If the PIN information is correct, control is transferred to block 508. The latter block obtains the desired frequency of use that the user of the wireless terminal desires of this type of service. Decision block 509 then determines if the user is requesting that this type of service be provided on a permanent basis. If the answer is yes, control is transferred to block 510 which attempts to update the portion of the service profile information stored in the wireless terminal and does update the service profile in ACD system 102 or wireless switching system 103. Included with the service profile information transferred to the wireless terminal is the password that was given to the wireless terminal in block 409 of FIG. 4. The wireless terminal verifies that the correct password is received and sends a message back accepting or rejecting the changes to the service profile. Decision block 511 determines if the wireless terminal allowed the updating of the service profile information. If the answer is no, control is transferred to block 517 which performs error recovery which includes removing the service profile information from ACD system 102 or wireless switching system 103 before transferring control back to decision block 401 of FIG. 4. If the answer in decision block 511 is yes, control is transferred to block 516 which provides the service to the wireless terminal before transferring control back to decision block 401 of FIG. 4.

Returning to decision block 509, if the answer is no meaning that the user is not desiring permanent use of the type of service, control is transferred to block 512 which obtains the information defining how long the user of the wireless terminal wishes to have this type of service provided. Block 513 stores this duration information in ACD system 102 or wireless switching system 103 and attempts to transfer changes to the service profile to the wireless terminal. Decision block 514 determines if the wireless terminal allowed this temporary updating of the service profile. If the answer is no, control is transferred to block 517 whose operations has already been described. If the answer in decision block 514 is yes, control is transferred to block 516 whose operations have already been described.

Figure 6:
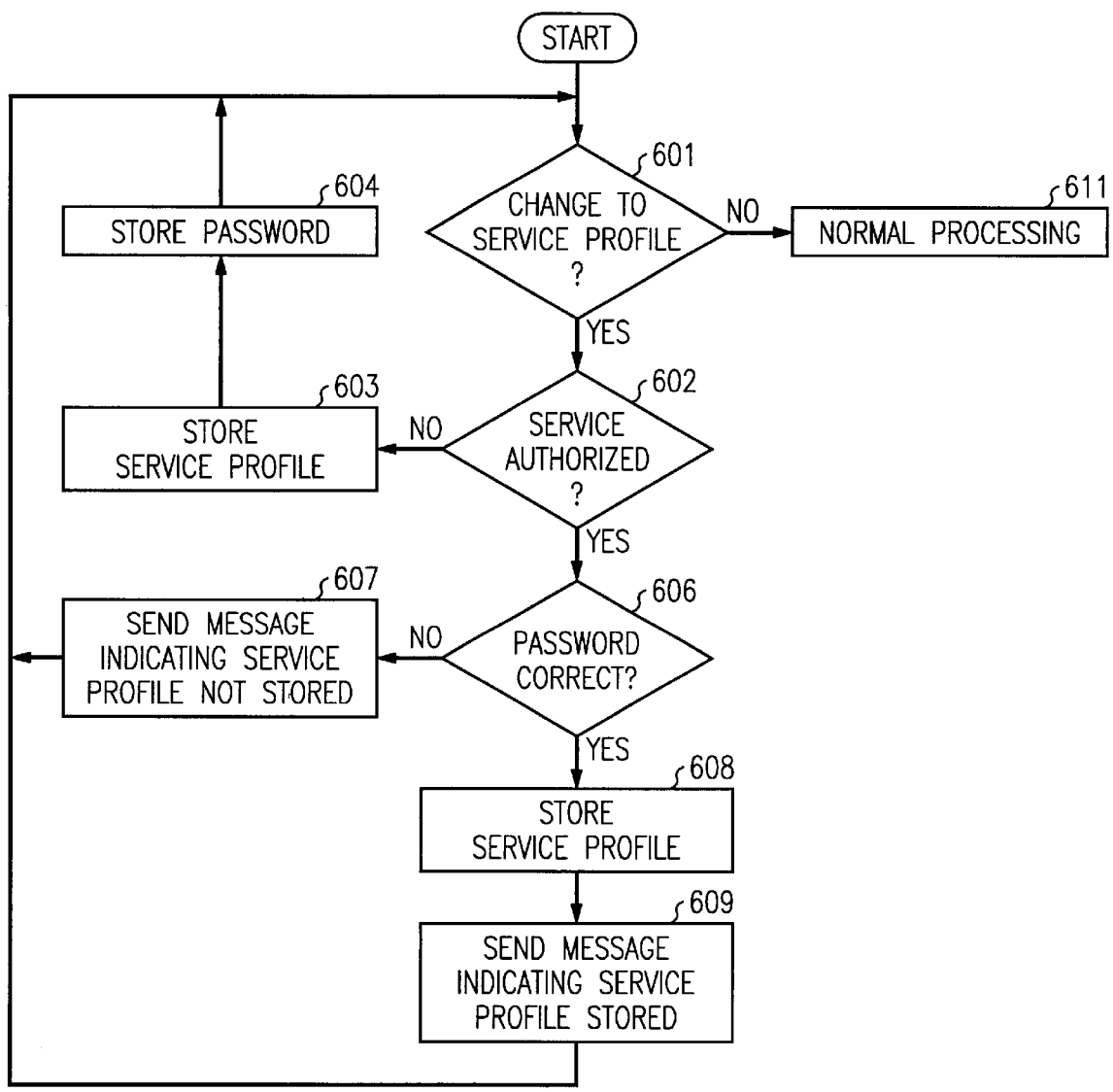
FIG. 6 is a flow diagram of the operations performed by a wireless terminal.

FIG. 6 illustrates, in flow chart form, the operations performed by a wireless terminal in responding to changes to the service profile information stored within the wireless terminal. Decision block 601 determines if the message indicates a change to the service profile, if the answer is no, control is transferred to block 611 which performs normal processing before returning control back to decision block 601. If the answer is yes in decision block 601, decision block 602 determines whether or not the wireless terminal has been authorized any wireless service on wireless switching system 103. If the answer is no, control is transferred to block 603. The decision in decision block 602 that the answer is no, means that the telephone has not been authorized yet for wireless service. Block 603 stores the service profile information, and block 604 stores the password which will allow future changes to the service profile. After execution of block 604, control is transferred back to decision block 601.

Returning to decision block 602, if the answer is yes, decision block 606 determines if the password in the message is correct. If the answer is no, block 607 transmits a message back to wireless switching system 103 indicating that the service profile information has not been stored within the wireless terminal before transferring control back to decision block 601. If the answer in decision block 606 is yes, block 608 stores the service profile information within the wireless terminal, and block 609 transmits a message to wireless switching system 103 indicating that the service profile has been stored before transferring control back to decision block 601.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method for provision of a type of wireless service for wireless terminals by a wireless switching system controlled by a wireless service provider, comprising the steps of:

detecting a present reguest to use the type of wireless service by one of the wireless terminals that is unauthorized for the one of the wireless terminals;

establishing a call between the one of the wireless terminals and an agent of the wireless service provider;

determining suitability of the one of the wireless terminals to use the type of wireless service by the agent;

transferring information to the wireless switching system by the agent to authorize the type of wireless service for the one of the wireless terminals;

authorizing the type of wireless service to be provided for the one of the wireless terminals on an ongoing basis by the wireless switching system in response to the information from the agent; and providing the type of wireless service to the one of the wireless terminals for the present reguest and subsequent requests by the wireless switching system in response to authorization of the type of wireless service for the one of the wireless terminals.

2. The method of claim 1 wherein the type of wireless service is initial service.

3. The method of claim 2 wherein the step of determining comprises the step of receiving billing information from the user of one of the wireless terminals.

4. The method of claim 3 wherein the step of enabling further comprises the step of transferring information to the one of wireless terminals via the wireless switching system to allow the type of wireless service for the one of the wireless terminals by the agent.

5. The method of claim 1 wherein the type of wireless service is a service other than ability to make a local basic voice call.

6. The method of claim 6 wherein the step of determining comprises receiving the identity of the user of the one of the wireless terminals.

7. The method of claim 6 wherein the step of enabling comprises the step of allowing the one of the wireless terminals to perform the type of wireless service a predefined number of times.

8. The method of claim 7 wherein the type of wireless service is a domestic long distance call.

9. The method of claim 7 wherein the type of wireless service is a overseas long distance call.

10. An apparatus for performing the method of claim 1.
11. An apparatus for performing the method of claim 2.
12. An apparatus for performing the method of claim 3.
13. An apparatus for performing the method of claim 4.
14. An apparatus for performing the method of claim 5.
15. An apparatus for performing the method of claim 6.
16. An apparatus for performing the method of claim 7.
17. An apparatus for performing the method of claim 8.
18. An apparatus for performing the method of claim 9.

* * * * *